United States Patent [19]

Morini

[11] Patent Number: 5,618,015
[45] Date of Patent: Apr. 8, 1997

[54] CLIP FOR FASTENING PIPES AND SIMILAR ARTICLES

[75] Inventor: Marco Morini, Saint-Vincent, Italy

[73] Assignee: Lys Fusion, S.p.A., Hone, Italy

[21] Appl. No.: 606,458

[22] Filed: Mar. 4, 1996

[30] Foreign Application Priority Data

Mar. 3, 1995 [IT] Italy ............... TO95A0152

[51] Int. Cl.⁶ .................................. F16L 3/08
[52] U.S. Cl. .............. 248/74.2; 248/316.5; 248/316.7
[58] Field of Search ................. 248/74.2, 316.1, 248/316.5, 316.7

[56] References Cited

U.S. PATENT DOCUMENTS

| 4,195,807 | 4/1980 | Llauge | 248/74.2 |
|---|---|---|---|
| 4,450,605 | 5/1984 | Schaty | 248/74.2 X |
| 4,591,119 | 5/1986 | Kraus | 248/74.2 |
| 4,655,424 | 4/1987 | Oshida | 248/74.2 X |
| 4,779,828 | 10/1988 | Munch | 248/74.4 X |
| 4,802,646 | 2/1989 | Cattani | 248/316.5 |
| 4,840,345 | 6/1989 | Neil et al. | 248/74.2 |
| 5,170,984 | 12/1992 | Ruckwardt | 248/74.2 X |
| 5,458,303 | 10/1995 | Ruckwardt | 248/74.2 |
| 5,464,179 | 11/1995 | Ruckeardt | 248/74.2 X |

FOREIGN PATENT DOCUMENTS 3002031  7/1982  Germany.

Primary Examiner—Ramon O. Ramirez
Assistant Examiner—Michael J. Turgeon
Attorney, Agent, or Firm—Schwartz & Weinrieb

[57] ABSTRACT

A clip for fastening members such as pipes or similar articles or components to a part of a support such as a vehicle frame, and of the type presenting a body with at least one partially closed seat defined by a flexible inner and outer wall substantially concentric with each other and each presenting a mouth; characterized in that the outer wall presents, a given distance from its mouth, a retaining tooth facing inwards towards the inner wall; and the inner wall presents, close to its mouth, a tooth facing outwards and away from the seat; the teeth of the inner and outer walls being positioned facing and close to each other but not mutually engaged when the clip is idle but engaging each other, if the pipe or similar article or component is involuntarily attempted to be withdrawn from the seat so as to in fact prevent such involuntary withdrawal of the pipe or similar article or component from the seat.

18 Claims, 3 Drawing Sheets

CLIP FOR FASTENING PIPES AND SIMILAR ARTICLES

FIELD OF THE INVENTION

The present invention relates to a clip for fastening members such as fluid pipes, and of the type used for fastening pipes or similar articles or components to parts of a support, particularly beneath a vehicle frame.

More specifically, the present invention relates to a clip of the type presenting a partially closed seat defined by elastic walls, which flex when pressure is applied there to so as to insert the pipe or similar article or component inside the seat, and which subsequently retain the pipe or similar article or component in opposition to forces which tend to withdraw it from the seat.

BACKGROUND OF THE INVENTION

A common drawback of clips of this type is that the resistance to withdrawal of the pipe or similar article or component is directly proportional to that of insertion. That is, the resistance to withdrawal of the pipe or similar, article or component which should be as high as possible to ensure effective retention, cannot be increased without causing a corresponding increase in the resistance to insertion, which on the other hand should be as low as possible. As a result, to ensure sufficiently safe retention, the resistance to insertion is such as to seriously impede assembly of the pipe or similar article or component.

It has been proposed, for example in German Patent No. 3,002,031, to divide the flexible wall defining the seat into two separate, substantially concentric parts, the main purpose of which being to enable the clip to accommodate pipes or similar articles or components of different sizes, and to protect the retaining wall against stones thrown up by the vehicle. The inside of the wall cooperating directly with the pipe or similar article or component is relatively highly flexible so as to adapt to pipes or similar articles or components of widely differing diameters, while the outside of the wall not cooperating directly with the pipe or similar article or component acts as a protective shield. Although the flexural strength of both parts of the wall provides for retention, and both parts of the wall cooperate to prevent withdrawal of the pipe or similar article or component—in the presence of a force tending towards withdrawal, the inside of the wall rests against the outside—the above solution fails to provide for reducing the resistance of the clip to insertion of the pipe or similar article or component inside the seat, which resistance still remains proportional to the withdrawal resistance.

OBJECTS OF THE INVENTION it is an object of the present invention to provide a clip of the aforementioned type, designed to dissociate to a large extent the resistance to insertion from the resistance to withdrawal of the pipe or similar, article or component and to enable each resistance to be selected independently and of the appropriate value, that is, low for insertion and high for withdrawal, at the design stage. It is a further object of the present invention to enable troublefree voluntary withdrawal of the pipe or similar article or component from the seat, despite the high resistance of the clip to non-voluntary withdrawal. Yet a further object of the present invention is to enable the above characteristics to be achieved with no great increase in the production cost of the clip.

SUMMARY OF THE INVENTION

According to the present invention, there is provided a clip for fastening members such as pipes or similar articles or components to a part of a support such as a vehicle frame, and of the type comprising a body with at least one partially closed seat defined by a flexible inner and outer wall substantially concentric with respect to each other and each presenting a mouth; characterized in that the outer wall presents, a predetermined distance from its mouth, a retaining tooth facing inwardly towards its mouth; and the inner wall presents, close to its mouth, a tooth facing outwardly and away from its mouth; the teeth of the inner and outer walls being positioned so as to face each other and be close to each other but not mutually engaged with each other when the clip is idle or not being used to house or secure a pipe or similar article or component.

By virtue of the above design, when a pipe or similar article or component is inserted inside the clip, the outer wall moves first so as to separate and prevent engagement of the two teeth, and the inner wall then moves so as to permit access to the seat; both of which operations are performed in opposition to the flexural strength of the two walls, which may be designed to flex easily. Once the pipe or similar article or component is inserted, the inner wall encloses the pipe or similar article or component inside the seat, and the outer wall springs back to the idle position so that the respective teeth are again positioned facing each other and close to each other but not mutually engaged. At this point, if any accidental force should tend to withdraw the pipe or similar article or component from the seat, the inner wall moves slightly so as to engage the teeth of the two walls and to positively prevent the inner wall from being moved further and sufficiently to enable withdrawal. Conversely, to voluntarily withdraw the pipe or similar article or component from the seat, the mouth of the outer wall is simply moved using an appropriate tool, to prevent the teeth of the two walls from engaging, and so as to enable troublefree withdrawal.

Preferably, the mouth of the outer wall is so shaped and located that, when past by the pipe or similar article or component being inserted, the outer wall, as it springs back, subjects the pipe or similar article or component to pressure in the insertion direction, thus further reducing the force required to insert the pipe or similar article or component inside the seat in opposition to the elastic resistance of the inner wall.

The clip according to the present invention therefore provides for dissociating to a large extent the insertion resistance—which may be made low enough to enable troublefree insertion of the pipe or similar article or component—from the non-voluntary withdrawal resistance—which may be made much higher—while at the same time enabling troublefree voluntary withdrawal of the pipe or similar article or component, and with no great increase in the production cost of the clip, which, as can be seen, is of extremely straightforward design and easily manufactured using straightforward molds.

BRIEF DESCRIPTION OF THE DRAWINGS

Various other objects, features, and attendant advantages of a non-limiting embodiment of the present invention will be described by way of example within the following detailed description and with reference to the accompanying drawings, in which like reference characters designate like or corresponding parts throughout the several views, and wherein.

DETAILED DESCRIPTION OF THE INVENTION

Figure 1:
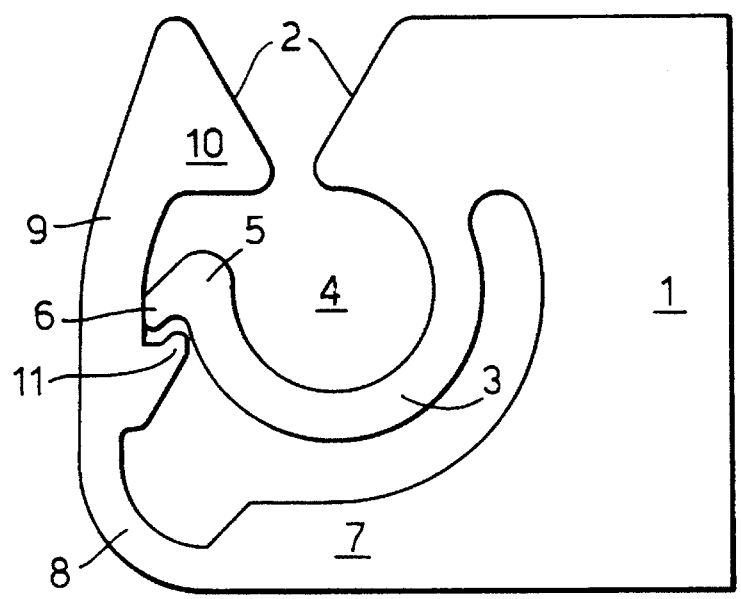
FIG. 1 is an enlarged view, along the seat axis, of a clip constructed in accordance with the present invention and shown in the idle position.

For the sake of simplicity, the clip according to the present invention is shown in its basic form, presenting one seat for one pipe or similar, article or component, the body of the clip may present, in a known manner, two or more seats for as many pipes or similar articles or components.

The clip according to the present invention comprises a body 1, which may be provided with any known means, for example holes, pins, tabs, flanges, or the like, for connecting it to a part of a support, and which presents a pair of laterally spaced inclined surfaces 2 for assisting, in known manner, insertion of a pipe T or similar article inside the body 1.

Body 1 comprises a first flexible, relatively thin, curved member which defines an inner wall 3 partly defining a seat 4, and terminating with a mouth 5 from which a tooth 6 extends outwardly so as to extend away from the seat portion 4.

Body 1 also comprises a second curved member which defines an outer wall 7–8–9 a given distance from and surrounding inner wall 3, and which terminates with a mouth 10 facing the inclined surface 2 operatively associated with inner wall 3. In the preferred embodiment shown, the outer wall comprises a particularly rigid initial portion 7; a thinner intermediate portion 8 defining the flexing portion of the outer wall; and a portion 9 presenting a tooth 11 facing inwards and towards but spaced a given distance from mouth 10, and more specifically located close to tooth 6 of inner wall 3. As shown in FIG. 1, when the clip is idle, teeth 6 and 11 are positioned facing and close to each other, but are separated by a small amount of clearance, that is they are not mutually engaged.

Figure 2:
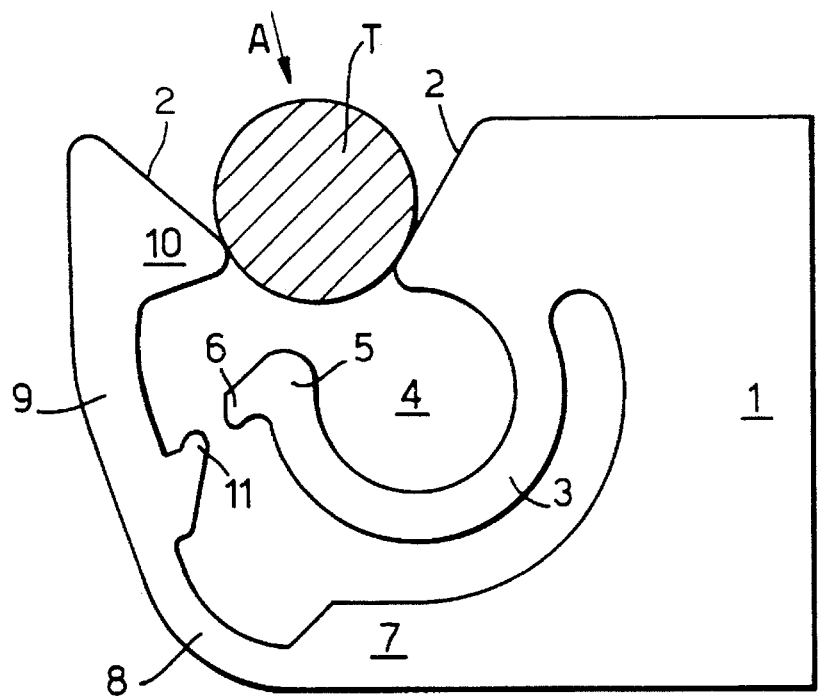
FIG. 2 is a similar view as that of FIG. 1 which shows the same clip as the pipe or similar article or component is first inserted.

As shown in FIG. 2, if a pipe T or similar article or component is placed against the inclined surfaces 2 and pushed into the clip in the direction of arrow A, mouth 10 is pushed outwards together with portion 9 of the outer wall, which flexes at portion 8 so as to separate and so position teeth 11 and 6 as to prevent them from engaging. At this stage, insertion is opposed solely by the flexural strength of the outer wall, and more specifically of portion 8, which may be made fairly flexible to assist insertion.

Figure 3:
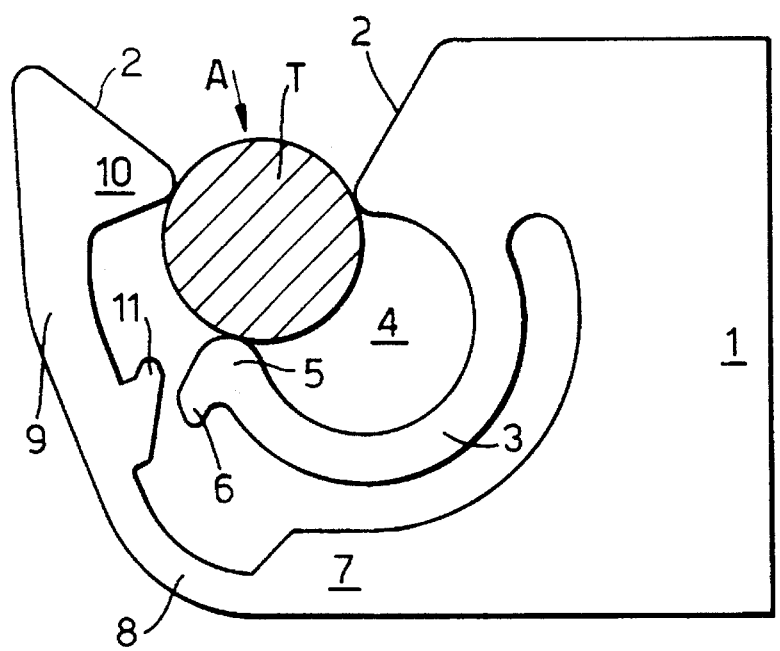
FIG. 3 is a similar view as that of FIG. 2 which shows the same clip as the pipe or similar article or component is inserted further.
Figure 4:
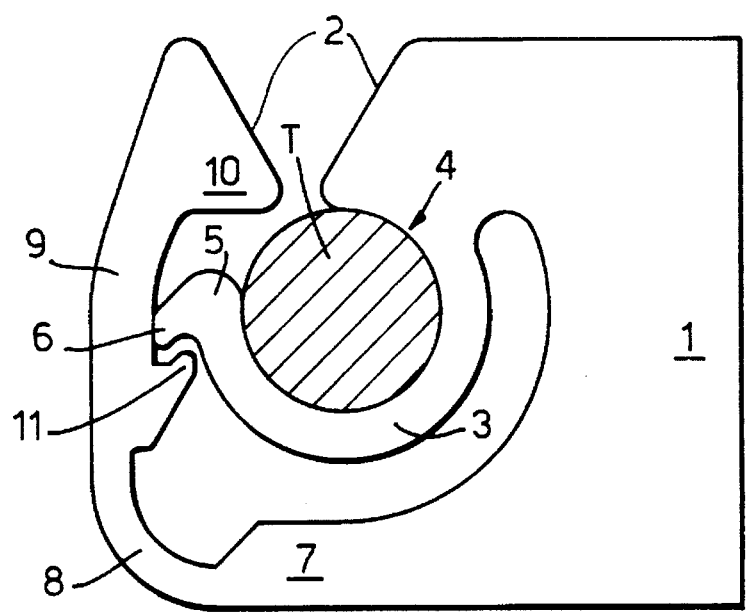
FIG. 4 is a similar view as that of FIG. 3 which shows the same clip with the pipe or similar article or component inserted inside the seat and subjected to no force tending to withdraw it.

As pipe T or similar article or component is inserted further in the direction of arrow A and past mouth 10 of the outer wall, the outer wall tends to flex back to the idle position and applies pressure on pipe T or similar article or component in the direction of seat 4, which pressure combines with the force applied in the direction of arrow A to assist further insertion. As shown in FIG. 3, pipe T or similar, article or component now resting on and pushed against mouth 5 of inner wall 3, pushes mouth 5 outwardly and away from inner wall 3 so that the pipe or similar article or component T can ease into seat 4, at which stage, insertion is opposed solely by the flexural strength of inner wall 3, which, not being called upon to perform a retaining function according to the present invention, may also be made fairly flexible. Pipe T or similar article or component thus settles inside seat 4 (FIG. 4) without encountering any real resistance, by which time the outer wall has sprung back to the idle position, and teeth 6 and 11 are again positioned facing and close to each other but not mutually engaged.

Figure 5:
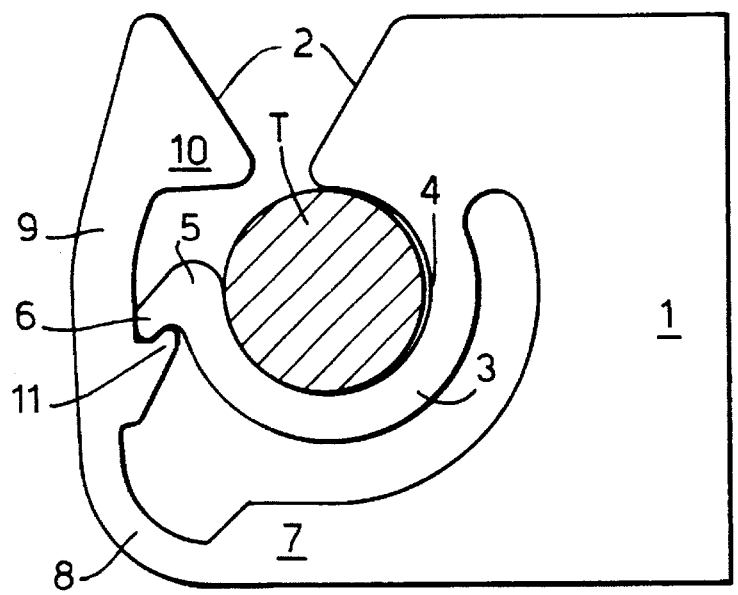
FIG. 5 is a similar view as that of FIG. 4 which shows the same clip when a non-voluntary force is applied to withdraw the pipe or similar article or component.

If, at this point (FIG. 5), any non-voluntary force is applied which tends to withdraw pipe T or similar article or component from seat 4, inner wall 3 is expanded slightly as a result of mouth portion 5 thereof being moved toward the left and downwardly as viewed in the drawings so as to mutually engage teeth 6 and 11; and any further deformation of inner wall 3, which would be required to withdraw pipe T or similar article or component from seat 4, is opposed, not by the flexural strength of the inner wall or portions 8–9 of the outer wall, but by the high flexural strength of outer wall portion 7 to which the applied force is transmitted in the form of compression by portions 8–9. By in no way determining the insertion resistance of the clip, outer wall portion 7 may thus present high flexural strength to achieve the desired resistance, however high, to non-voluntary withdrawal of the pipe or similar article or component from the clip.

Figure 6:
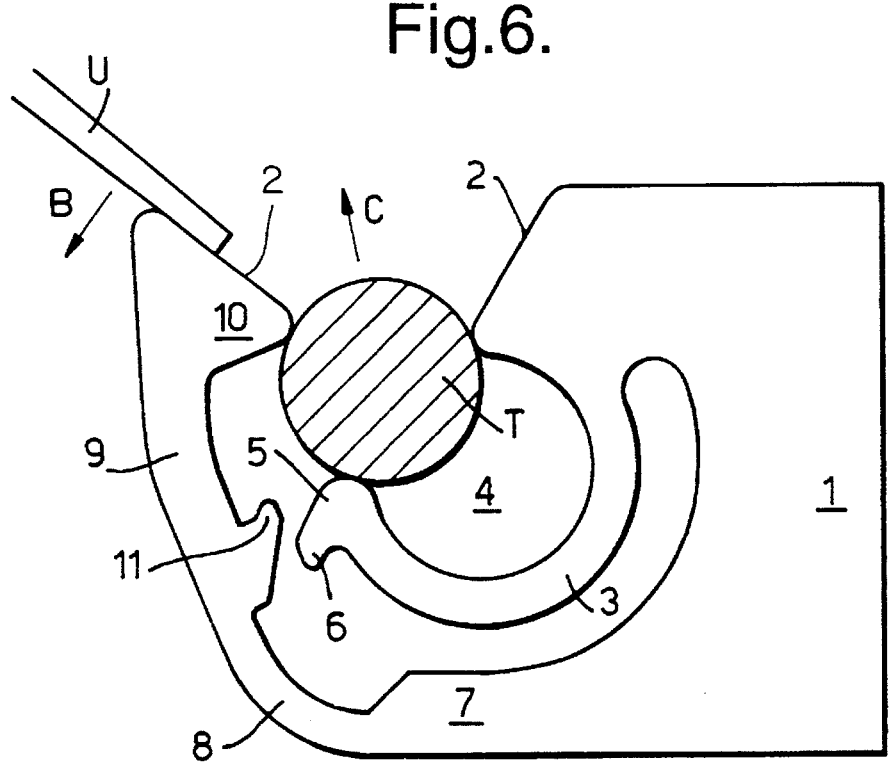
FIG. 6 is a similar view as that of FIG. 4 which shows the same clip subjected to a voluntary force to withdraw the pipe or similar article or component.

Conversely, to voluntarily remove pipe T or similar article or component from the clip, outer wall portion 9 is simply flexed by pressing any appropriate tool U on the inclined surface of mouth 10 in the direction of arrow B (not a lot of pressure is required, owing to the flexibility of outer wall portion 8) so as to position tooth 11 so as to prevent it from being engaged by tooth 6 of the inner wall (FIG. 6); and a small amount of force is applied to pipe T or similar article or component in the direction of arrow C to withdraw it, from seat 4 now in opposition solely to the modest flexural strength of inner wall 3.

The present invention therefore provides for effectively dissociating insertion and withdrawal resistance; insertion resistance being reduced by accordingly sizing inner wall 3 and at least part of the outer wall, such as flexible portion 8; and non-voluntary withdrawal resistance being enhanced independently of insertion resistance by accordingly sizing outer wall portion 7, and with no increase in the force required to voluntarily withdraw the pipe or similar article or component from the clip.

The characteristics of the present invention in no way complicate the process or molds by which to mold the clip from plastic material, so that it is substantially inexpensive to produce.

Clearly, technical equivalents may be substituted and changes made to the clip as described and illustrated herein without, however, departing from the scope of the present invention. For example, mouths 5 and 10 may be any shape, depending on the application or whether or not inappropriate external action on them is to be prevented; inner wall 3 may be shaped to accommodate other than circular pipes or similar; article or component thin portion 8 of the outer wall may be dispensed with if portion 9 is sufficiently flexible; the clip may advantageously be duplicated symmetrically in relation to body 1, to accommodate two pipes or similar article or component on either side of the body; and, as stated, body 1 may be provided with any means for connecting it to a support, in particular a vehicle frame. It is therefore to be understood that within the scope of the appended claims, the present invention may be practiced otherwise than as specifically described herein.

I claim:

1. A clip for mounting an elongate member upon a support member, comprising:

a body member for attachment to a support member;

an inner wall member, defining a seat portion within which an elongate member can be seated so as to permit said elongate member to be mounted upon a support member, flexibly integral with said body member so as to permit said seat portion to be expanded and contracted in order to respectively permit said elongate member to be inserted into said seat portion and be retained within said seat portion;

an outer wall member substantially partially concentrically surrounding said flexible inner wall member and being flexibly integral at a first proximal end portion thereof with said body member so as to be movable between a first position at which said outer wall member cooperates with said inner wall member so as to retain said elongate member within said seat portion of said inner wall member, and a second position at which said outer wall member permits said elongate member to be inserted into and removed from said seat portion of said inner wall member, said outer wall member having a second distal end portion thereof cooperating with said body member so as to define a passageway for said elongate member into and out of said seat portion of said inner wall member and said clip;

first latching means provided upon said inner wall member; and second latching means provided upon said outer wall member at a position intermediate said first proximal and second distal end portions thereof and being normally disengaged from said first latching means of said inner wall member, so as to permit said outer wall member to be moved from said first position to said second position in order to permit said elongate member to be subsequently inserted into and removed from said seat portion of said inner wall member, but being engageable with said first latching means of said inner wall member when said elongate member is attempted to be withdrawn from said seat portion of said inner wall member while said outer wall member is disposed at said first position so as to prevent withdrawal of said elongate member from said seat portion of said inner wall member.

2. A clip as set forth in claim 1, wherein:

said inner and outer wall members have substantially U-shaped cross-sectional configurations.

3. A clip as set forth in claim 1, wherein:

said outer wall member comprises at least one substantially thinned portion which permits said distal end portion of said outer wall member to undergo flexible hinged movements with respect to said inner wall member.

4. A clip as set forth in claim 1, wherein:

said body member and said distal end portion of said outer wall member are provided with adjacent portions which are inclined toward each other such that said adjacent inclined portions together define guide means for said passageway for facilitating insertion of said elongate member into said clip and toward said seat portion of said inner wall member.

5. A clip as set forth in claim 4, wherein:

said inner wall member, including a proximal end portion integral with said inclined portion of said body member, comprises an arcuate extent of approximately 270° so as to define said seat portion for accommodating said elongate member in a substantially encircled manner; and said distal end portion of said outer wall member is disposed adjacent to said proximal end portion of said inner wall member, when said outer wall member is disposed at said first position, so as to cooperate with said proximal end portion of said inner wall member in substantially completely encircling said elongate member when said elongate member is seated within said seat portion of said inner wall member.

6. A clip as set forth in claim 5, wherein:

said distal end portion of said outer wall member is located adjacent to said distal end portion of said inner wall member such that when said elongate member is being mounted upon said clip, is being moved in an insertion direction toward said seat portion of said inner wall member, has caused said outer wall member to be moved from said first position toward said second position, and has substantially moved past said distal end portion of said outer wall member, said distal end portion of said outer wall member, under the biasing influence of a restoring force inherently tending to move said outer wall member back toward said first position from said second position due to said flexible mounting of said outer wall member upon said body member, will engage said elongate member and forcefully bias said elongate member into said clip and toward said seat portion of said inner wall member in said insertion direction.

7. A clip for mounting an elongate member upon a support member, comprising:

a body member for attachment to a support member;

an inner wall member, defining a seat portion within which an elongate member can be seated so as to permit said elongate member to be mounted upon a support member, flexibly integral with said body member so as to permit said seat portion to be expanded and contracted in order to respectively permit said elongate member to be inserted into and removed from said seat portion, and be retained within said seat portion;

an outer wall member substantially partially concentrically surrounding said flexible inner wall member and being flexibly integral at a first proximal end portion thereof with said body member so as to be movable between a first position at which said outer wall member cooperates with said inner wall member so as to retain said elongate member within said seat portion of said inner wall member, and a second position at which said outer wall member permits said elongate member to be inserted into and removed from said seat portion of said inner wall member, said outer wall member having a second distal end portion thereof cooperating with said body member so as to define a passageway for said elongate member into and out of said seat portion of said inner wall member and said clip;

first latching means provided upon said inner wall member; and second latching means provided upon said outer wall member at a position intermediate said first proximal and second distal end portions thereof and being normally disengaged from said first latching means of said inner wall member, so as to permit said outer wall member to be moved from said first position to said second position in order to permit said elongate member to be subsequently inserted into and removed from said seat portion of said inner wall member, but being engageable with said first latching means of said inner wall member if said elongate member is attempted to be withdrawn from said seat portion of said inner wall member prior to movement of said outer wall member from said first position to said second position so as to prevent expansion of said inner wall member and consequent withdrawal of said elongate member from said seat portion of said inner wall member.

8. A clip as set forth in claim 7, wherein:

said inner and outer wall members have substantially U-shaped cross-sectional configurations.

9. A clip as set forth in claim 7, wherein:

said outer wall member comprises at least one substantially thinned portion which permits said distal end portion of said outer wall member to undergo flexible hinged movements with respect to said inner wall member.

10. A clip as set forth in claim 7, wherein:

said body member and said distal end portion of said outer wall member are provided with adjacent portions which are inclined toward each other such that said adjacent inclined portions together define guide means for said passageway for facilitating insertion of said elongate member into said clip and toward said seat portion of said inner wall member.

11. A clip as set forth in claim 10, wherein:

said inner wall member, including a proximal end portion integral with said inclined portion of said body member, comprises an arcuate extent of approximately 270° so as to define said seat portion for accommodating said elongate member in a substantially encircled manner; and said distal end portion of said outer wall member is disposed adjacent to said proximal end portion of said inner wall member, when said outer wall member is disposed at said first position, so as to cooperate with said proximal end portion of said inner wall member in substantially completely encircling said elongate member when said elongate member is seated within said seat portion of said inner wall member.

12. A clip as set forth in claim 11, wherein:

said distal end portion of said outer wall member is located adjacent to said distal end portion of said inner wall member such that when said elongate member is being mounted upon said clip, is being moved in an insertion direction toward said seat portion of said inner wall member, has caused said outer wall member to be moved from said first position toward said second position, and has substantially moved past said distal end portion of said outer wall member, said distal end portion of said outer wall member, under the biasing influence of a restoring force inherently tending to move said outer wall member back toward said first position from said second position due to said flexible mounting of said outer wall member upon said body member, will engage said elongate member and forcefully bias said elongate member into said clip and toward said seat portion of said inner wall member in said insertion direction.

13. A clip for mounting an elongate member upon a support member, comprising:

a body member for attachment to a support member;

an inner wall member, defining a seat portion within which an elongate member can be seated so as to permit said elongate member to be mounted upon a support member, flexibly integral with said body member so as to permit said seat portion to be expanded and contracted in order to respectively permit said elongate member to be inserted into and removed from said seat portion, and be retained within said seat portion;

an outer wall member substantially partially concentrically surrounding said flexible inner wall member and being flexibly integral at a first proximal end portion thereof with said body member so as to be movable between a first position at which said outer wall member cooperates with said inner wall member so as to retain said elongate member within said seat portion of said inner wall member, and a second position at which said outer wall member permits said elongate member to be inserted into and removed from said seat portion of said inner wall member, said outer wall member having a second distal end portion thereof cooperating with said body member so as to define a passageway for said elongate member into and out of said seat portion of said inner wall member and said clip;

first latching means provided upon said inner wall member; and second latching means provided upon said outer wall member at a position intermediate said first proximal and second distal end portions thereof and being normally disengaged from said first latching means of said inner wall member, so as to permit said outer wall member to be moved from said first position to said second position in order to permit said elongate member to be subsequently inserted into and removed from said seat portion of said inner wall member, but being engageable with said first latching means of said inner wall member if said elongate member is attempted to be withdrawn from said seat portion of said inner wall member, unless said outer wall member is previously moved from said first position to said second position, so as to prevent withdrawal of said elongate member from said seat portion of said inner wall member.

14. A clip as set forth in claim 13, wherein:

said inner and outer wall members have substantially U-shaped cross-sectional configurations.

15. A clip as set forth in claim 13, wherein:

said outer wall member comprises at least one substantially thinned portion which permits said distal end portion of said outer wall member to undergo flexible hinged movements with respect to said inner wall member.

16. A clip as set forth in claim 13, wherein:

said body member and said distal end portion of said outer wall member are provided with adjacent portions which are inclined toward each other such that said adjacent inclined portions together define guide means for said passageway for facilitating insertion of said elongate member into said clip and toward said seat portion of said inner wall member.

17. A clip as set forth in claim 16, wherein:

said inner wall member, including a proximal end portion integral with said inclined portion of said body member, comprises an arcuate extent of approximately 270° so as to define said seat portion for accommodating said elongate member in a substantially encircled manner; and said distal end portion of said outer wall member is disposed adjacent to said proximal end portion of said inner wall member, when said outer wall member is disposed at said first position, so as to cooperate with said proximal end portion of said inner wall member in substantially completely encircling said elongate member when said elongate member is seated within said seat portion of said inner wall member.

18. A clip as set forth in claim 17, wherein:

said distal end portion of said outer wall member is located adjacent to said distal end portion of said inner wall member such that when said elongate member is being mounted upon said clip, is being moved in an insertion direction toward said seat portion of said inner wall member, has caused said outer wall member to be moved from said first position toward said second position, and has substantially moved past said distal end portion of said outer wall member, said distal end portion of said outer wall member, under the biasing influence of a restoring force inherently tending to move said outer wall member back toward said first position from said second position due to said flexible mounting of said outer wall member upon said body member, will engage said elongate member and forcefully bias said elongate member into said clip and toward said seat portion of said inner wall member in said insertion direction.

* * * * *